United States Patent Office 3,661,838
Patented May 9, 1972

3,661,838
SCENTED PLASTIC COMPOSITION
Fumio Enomoto, 4–5 Bunkyo-machi, Hatano,
Kanagawa, Japan
No Drawing. Continuation-in-part of application Ser. No. 686,791, Nov. 30, 1967. This application Mar. 9, 1970, Ser. No. 17,871
Int. Cl. C08k *1/08, 1/20;* A61k *1/02*
U.S. Cl. 260—41 A        12 Claims

ABSTRACT OF THE DISCLOSURE

A scented plastic composition capable of emitting a scent is obtained by dispersing in a gas-permeable plastic material a porous finely divided silica powder having adsorbed thereon a liquid scent-emitting substance, such as a floral perfume or an essential oil. Processes of preparation are described.

---

This application is a continuation-in-part of Ser. No. 686,791, filed Nov. 30, 1967, now abandoned.

The present invention is concerned with a scented plastic composition which is obtained by dispersing in a gas-permeable plastic material, e.g. by melting or dissolving techniques, a scent-emitting porous finely divided silica powder having adsorbed thereon a liquid scent-emitting substance, so that said substance is contained in said plastic material.

By molding and processing such a composition as described more in detail hereinbelow, it is possible to obtain a molded article, a sheet, a net or a laminate article which is capable of emitting a scent which is either pleasant for human beings or which attracts or repels insects. These products can be utilized for various purposes, such as perfumed plastic decorative articles.

So far, various attempts have been made to impart scents or odors to plastic materials. Such prior art includes, for example, a process which comprises admixing a thermoplastic resin with a floral perfume, such as rose, lily or jasmine perfume, or with an essential oil, such as orange-peel oil, and thereafter subjecting the resulting mixture to heat-melting. However, many of the floral perfumes and essential oils do not go in solution in plastic materials and, moreover, many of these floral perfumes and essential oils have boiling points which are relatively low. Accordignly, when floral perfumes and essential oils are subjected to the heat-molding temperatures of plastics, they evaporate or decompose and, as a result, the processed plastics are found to possess scents which are markedly different from the true scents. Even when part of the floral perfume or the essential oil successfully goes in solution in the plastic material at the time of heat-melting, such perfume or essential oil becomes isolated from the plastic material as the plastic material is cooled and solidified, and the isolated perfume or essential oil exudes onto the face of the solidified plastic material, resulting in a rapid dissipation and loss of such perfume or essential oil.

With resins with which a liquid plasticizer is used for example, vinyl chloride, an attempt has been made to dissolve a liquid scent-emitting substance into the liquid plasticizer, and the mixture of scent-emitting substance and plasticizer is subsequently added to the resin, followed by heating and solidification. This process, however, requires the use of a plasticizer and a liquid scent-emitting substance that are mutually soluble. For this reason, there is naturally a certain limitation to the range of utility of such substances. Moreover, the liquid scent-emitting substances which are dissolved in plasticizers will evaporate or decompose due to the heat which is applied thereto at the time of the heat-melting process. With those other methods of the prior art, liquid scent-emitting substances dissolved in a plasticizer and then dispersed in a resin will, when this resin is cooled and solidified, ooze out onto the surfaces of the solidified resin and quickly evaporate. Furthermore, a liquid scent-emitting substance which has oozed out onto the surfaces of the resin, hampers the subsequent secondary processing of the resin.

After extensive research to find a scent-emitting plastic composition which is free of the aforesaid short-comings of the prior art and which is suitable for production on an industrial basis, the inventor has successfully worked out the present invention. More specifically, the present invention covers a plastic composition which is formed by dispersing a porous finely divided silica powder having adsorbed thereon a liquid scent-emitting substance in a gas permeable plastic material. The powder and adsorbed scent-emitting substance will be referred to for convenience as "scent-emitting silica powder."

The present invention has the following features:

(1) Porous finely divided silica powder having adsorbed thereon a liquid scent-emitting substance will uniformly disperse in plastic materials, irrespective of how large an amount of such scent-emitting substance is adsorbed, provided that said silica powder still retains its powder form.

(2) When the gas-permeable plastic material and the "scent-emitting silica powder" are mixed and kneaded together and then melted with heat to disperse said powder in the gas-permeable plastic material, the liquid scent-emitting substance contained in the powder will not evaporate or decompose due to the heat applied.

(3) The silica powder which contains a considerably large amount of liquid scent-emitting substance will not impair the plasticity or other properties of the plastic material when it is introduced into the plastic material.

(4) The liquid scent-emitting substance contained in said powder will permeate through the plastic material in a gaseous form, and the liquid substance will never ooze out or sweat out onto the surfaces of the molded plastic articles.

(5) When the "scent-emitting fine powder" and plastic material are melted together by heating, the molten mixture remains transparent while in molten state. Even when the plastic is cooled and solidified, the fine powder contained therein will not change the transparency of the plastic material, and therefore, it is possible to dye the plastic material to any desired color.

The liquid scent-emitting substances which can be used in the present invention include the aforesaid floral perfumes and essential oils as well as liquid substances that attract or repel insects. These substances may be used either independently or in combination.

The porous finely divided silica powder which is useful in the present invention includes hydrated silica powder prepared by so-called wet process. It is generally prepared by treating an aqueous solution of sodium silicate with an acid to deposit silica, separating it and drying it. It is often called "white carbon" and has a chemical formula $SiO_2 \cdot nH_2O$. A typical example thereof is "Tokusil" manufactured by Tokuyama Soda Co., Japan. It is a light powder having a true specific gravity of 1.95, an apparent specific gravity of 0.218–0.181, and single grain size of 10–40 millimicrons. An example of powder which is lighter than "Tokusil" among those prepared by said wet process is "Santocel," manufactured by Monsanto Chemical Co., U.S.A. "Santocel" is characterized by the fact that it gels silica and separates it by adding alcohol and heating under pressure when separating silica from water solution of sodium silicate. It has an apparent specific gravity of 0.096 and single grain size of 10–20 millimicrons. The silica powder having the smallest apparent specific gravity is anhydrous silica powder prepared by the so-called dry process. One example thereof is "Aerosil" manufactured by Degussa Co., Germany. It is prepared by thermal decomposition of silicon tetrachloride in oxygen with an hydrogen atmosphere. It has a chemical formula of $SiO_2$ and is a very light powder having an apparent specific gravity of 0.054 and a single grain size of 5–25 millimicrons. Hydrated or anhydrous silica powders may be used in the present invention. Mixtures may also be used. The fine silica powder is frequently referred to as "white carbon black." See for instance the publication in Chemical and Engineering News, vol. 27, No. 10, p. 679 (1949).

Several methods may be used for the preparation of the scent-emitting silica powder. One method called herein method A, consists of adding a liquid scent-emitting substance, for instance 150 parts of rose perfume to 190 parts of hydrated silica powder and kneading the material. Method B consists of adding the liquid perfume composition, for instance 150 parts by weight to 100 parts of hydrated salica powder, kneading until the liquid is absorbed by the powder and small aggregates are formed. Finally an additional 90 parts of the hydrated silica powder is added to the aggregates and kneaded. Method C which is illustrated in Examples 1–4 hereinbelow, consists of adding porous finely divided anhydrous silica powder to the aggregates formed from hydrated silica powder and the liquid scent-emitting substance. This method is superior to methods A and B. In the process C, porous, finely divided silica powder suitable to be added to the aggregates may be the powder having smaller apparent specific gravity than that of porous, finely divided silica powder used in forming the aggregates. When hydrated silica powder is added to the aggregates formed from the liquid scent-emitting substance and anhydrous silica powder and the product kneaded, no satisfactory scent-emitting silica powder is obtained. This process, which is not satisfactory, is referred to herein as process D.

The size of the aggregates of the scent-emitting silica powder has a definite effect upon the achievement of scented plastic material. If the size of each particle forming scent emitting silica powder is smaller than mesh 300 (B.S. system), then it effectively disperses into molten plastic material, for instance molten polyethylene, and the loss of liquid scent-emitting substance is substantially eliminated. As for the scent emitting characteristics, it has been found that no scent is noticed during the dispersion of the scent-emitting silica into the molten plastic material, and a weak scent is only noticed after cooling and solidification. After one or two weeks have elapsed, the scent gradually becomes stronger and finally the scent is emitted as expected. Of course, the scent emitting substance does not appear on the surface of molded plastic products. Specifically, by pulverizing said aggregates into small particles and by adding thereto a fresh supply of porous finely divided silica powder and by kneading the mixture, part of the liquid scent-emitting substance is brought into contact with this fresh powder and is adsorbed by the latter, so that, as a result, the initial aggregates are split into aggregates of smaller size. By repeating this procedure of contacting and adsorption an appropriate number of times, the aggregates are split further into minute aggregates up to a size which is not greater than Mesh No. 300.

The limit at which the porous silica powder and the liquid scent-emitting substance form aggregates resulting in a marked reduction in the volume thereof, varies with the respective inherent properties of those two components, but the limit is roughly when the liquid scent-emitting substance is about 50 to 67% of the total weight of the silica powder and the liquid scent-emitting substance.

The "scent emitting silica powder" is not only durable to emit a scent on account of the heavy content of liquid scent-emitting substance in an internal part which consists of aggregated particles each having liquid scent-emitting substance adsorbed thereon, but has a tendency to emit a scent on account of the porous structure of the external part consisting of a layer of porous fine silica powder. Furthermore, the "scent emitting silica powder" is not only easy to disperse in plastic materials in the molten state without the use of a dispersing agent, such as a metal soap, but also prevents the vaporization or the decomposition of the liquid scent emitting substance even though the temperature of the plastic material in molten state is higher than the boiling point of liquid scent emitting substance.

The plastic materials which are used in the present invention preferably are those which have a relatively high gas-permeability. However, in order to have a long period of scent emission, plastic materials having a lower degree of gas-permeability are preferred. Therefore, an appropriate degree of gas-permeability should be selected as desired so as to meet the individual purposes for which the products are to be used.

The resins which are preferred include polyethylene, polypropylene, cellulose acetate, methoxymethyl nylon, polyvinyl chloride and polyvinylidene chloride. The poor gas-permeability of polyvinyl chloride and polyvinylidene chloride can be improved, if desired, by the addition of a plasticizer. An increase in the amount of the plasticizer added will result in an increase in the gas-permeability of these latter two plastic materials. For example, polyvinyl chloride and a plasticizer in an amount 50% by weight thereof will have a gas-permeability which is comparable to that of polyethylene prepared by the high pressure process, which has the highest gas-permeability among the polyolefin group.

The procedure of dispersing the "scent-emitting silica powder" in the gas-permeable plastic material will hereunder be described in further detail.

Dispersion of the "scent-emitting silica powder" in polyethylene or polypropylene is conducted by the following procedure. First, the "scent-emitting silica powder" is added to polyethylene or polypropylene pellets or mixtures of these two polyolefins in powder form. The resulting mixture is then stirred in a tumbler to be thoroughly and uniformly mixed. Thereafter, the mixture is melt-extruded, by the application of heat, from an extruder in the form of thin strips. The extruded material is then cut into small lengths and finally formed into small pellets. Thus, pellets of a scent-emitting plastic composition are obtained. The weight of the pellets obtained after the heat-melting step is not significantly different from the weight of the mixture of "scent-emitting silica powder" and plastic material prior to the heat-melting. From this fact is noted that there has taken place hardly any evaporation or decomposition of the scent-emitting substance. The gas-permeable plastic material becomes rather gas-impermeable when it is in the molten state. For this reason, there is noted no emission of a scent from the plastic material during the melting period or in the period immediately after the extrusion-molding. It is after a lapse of several weeks that a gradually increasing strong scent is noted, and the scent-emission lasts for a considerably long period. For example, scented pellets formed from the aforesaid high pressure process polyethylene resin and a rose perfume in an amount of 2 to 3% by weight of said polyethylene, will begin strongly to emit a scent at the end of about one month after being molded. This molded article will continuously emit scent for an extended period of time, as long as one year, while being exposed to ambient atmosphere throughout this period. After this period, the scent emitted from this article gradually fades in intensity. However, even at the end of three more years, the article still retains the scent of the perfume and the odor which is peculiar to the polyethylene resin is never noticeable. One may be apt to consider that, when scented pellets of polyethylene are heat-melted, the liquid scent-emitting substance contained therein would evaporate and that, therefore, its loss would be great. It is to be noted, however, that the high gas-permeability of polyethylene decreases to almost nil while it is in the molten state, so that the liquid scent-emitting substance is not provided with a surface through which it is allowed to escape by evaporation into the ambient air. As a result, the loss of this liquid substance due to evaporation is greatly reduced, and the loss of this liquid substance from re-molding is negligible. Scented pellets are molded in a known molding manner into desired scented plastic articles.

The procedure for manufacturing a scented resin sheet by using a plasticizer-containing resin, that is to say, for example, the procedure for the manufacture of a scented vinyl chloride sheet, will be hereunder described. A "scent-emitting silica powder" is prepared by the use of a liquid scent-emitting substance in the manner previously described. A part of the vinyl chloride resin used in this process consists of paste resin. Preliminarily, said "scent-emitting silica powder" is added to said paste resin and the material is stirred to obtain a uniform mixture. Thereafter, the mixture is added to the remainder of the vinyl chloride resin and the total material is thoroughly mixed. The resulting mixture is kneaded, melted and solidified by the use of an extruder, and is calendered as required. As a result, a scent-emitting vinyl chloride sheet containing a liquid scent-emitting substance dispersed therein is obtained. This scented vinyl chloride sheet will produce a stronger scent after a lapse of some time as is the case with the aforesaid scented pellets. The scent-emitting sheet can be subjected to heat-processing for producing adhesion by the application of heat, and also for the fabrication of a laminate article with a support such as paper or cloth, or for other purposes.

Cellulose acetate resin can be made to contain a dispersed liquid scent-emitting substance by the application of a melting technique similar to that described above.

In case it is intended to use a plastic material dissolved in a solvent, a "scent-emitting silica powder" is prepared first by the use of a liquid scent-emitting substance in a manner described. This powder is mixed in a plastic solution while stirring. The result is that the plastic material is made to contain a "scent-emitting silica powder," which can be satisfactorily dispersed in the plastic material, regardless of the type of the solvent used. The solution of plastic material in which the "scent-emitting silica powder" is dissolved, is converted to a solid scent-emitting plastic material when the solvent is removed therefrom. For example, 8-nylon resin, methoxymethylated nylon is dissolved in methanol. Thereafter a "scent-emitting silica powder" is mixed with the resin, under stirring, so as to uniformly disperse the latter therein. Then the mixture is immersed in water to dilute the methanol. The resin is allowed to separate in the form of small chips, which are then filtered and dried. The product is a scent-emitting 8-nylon resin. The liquid after the resin has been filtered out, is not scented at all. Also, by applying onto a support, such as paper or cloth, a solution of a plastic material in which a "scent-emitting silica powder" is dispersed, followed by drying the solvent to solidify the resin in the form of film on the support, the resulting film will be obtained as a scent-emitting resin film containing a dispersed liquid scent-emitting substance, so that the resulting paper or cloth will retain the scent.

EXAMPLE 1

150 parts by weight of a prepared floral rose perfume was added to 100 parts by weight of hydrated silica prepared by the wet method, hereinafter referred to as "white carbon" to form a gel, which was then cut into small segments. 50 parts by weight of fresh white carbon was added to these small segments. Thereafter, 17 parts by weight of "Aerosil" were added thereto for uniform contact and adsorption, resulting in the formation of a fine powder, and thus a "scent-emitting silica powder" was formed. The powder thus prepared was added to 6300 parts by weight of high pressure polyethylene pellets and the mixture was mixed well in a tumbler. The mixture was then heat-melted in an extruder, and was subjected to extrusion. The extruded mixture was cooled with water and was cut into minute pieces by a cutter. As a result, scent-emitting poly) ethylene pellets containing about 2.27% by weight of rose perfume were obtained.

A better effect was obtained from the use of pellets which were partly substituted by powdered polyethylene. In order to make scent-emitting petals, having a thickness ranging from 0.2 mm. to 0.5 mm. and a weight of 16 grams of an artificial rose flower, the aforesaid scent-emitting polyethylene pellets were subjected to injection-molding. The molded article obtained continuously emitted scent for more than 6 months while being exposed to ambient air, and it was still scented at the end of one year. In this example, the addition of 33 parts by weight of metal soap, such as zinc stearate, which was added at the time said "scent-emitting silica powder" was mixed with the polyethylene pellets, facilitated the dispersion of the powder in polyethylene.

EXAMPLE 2

100 parts by weight of di-n-propyl isocinchomeronate (a fly-repellant), 16 parts by weight of ortho-dichlorobenzene and 9 parts by weight of cinnamicaldehyde were mixed together to prepare a liquid scent-emitting substance. This was added to 125 parts by weight of white carbon, and then 14 parts by weight of "Aerosil" were added. Thereafter, uniform adsorption was effected by kneading the mixture. Thereafter, 27 parts by weight of zinc stearate were added and uniformly mixed. The resulting mixture was added to 435 parts by weight of high pressure polyethylene powder and the material was mixed uniformly. The resulting mixture was added to 2900 parts by weight of high pressure polyethylene pellets and 2900 parts by weight of low pressure polyethylene pellets, and this was stirred and mixed well in a tumbler. While heating and melting the mixture in an extruder, the mixed resin was molded into a net form by the use of a net-forming die. Thus, a plastic net having portions where the diameter of the filament was in the range of from 0.5 mm. to 1.0 mm. was obtained. This net had a composition consisting of about 1.53% by weight of di-n-propyl isocinchomeronate, about 0.25% by weight of ortho-dichloro-benzene and about 0.14% by weight of cinnamic-aldehyde. The plastic net emitted a scent peculiar to cinnamon. In use, this net emitted a scent that was pleasant to humans but which repelled flies. The net has to date been continuously emitting this scent for a period of 6 months.

EXAMPLE 3

100 parts by weight of prepared rose perfume was mixed with 66 parts by weight of white carbon to prepare a gel. This gel was then added to 33 parts by weight of white carbon and 11 parts by weight of "Aerosil" to effect uniform adsorption, and as a result, a "scent-emitting silica powder" was obtained. This powder was added to 2600 parts by weight of vinyl chloride resin and 1300 parts by weight of dioctyl phthalate (plasticizer) and uniformly mixed by a mixer. Then the mixture was subjected to kneading by the use of an extruder, and calendered to produce a sheet of 0.2 to 0.22 mm. in thickness. As a result, a scent-emitting vinyl chloride sheet containing about 2.47% by weight of rose perfume is obtained. This sheet was unrolled and stored in a room as a curtain. After the end of a year, this sheet still has a scent.

EXAMPLE 4

A "scent-emitting silica powder" was obtained from 20 parts by weight of prepared rose perfume, 20 parts by weight of "white carbon" and 10 parts by weight of "Aerosil." 100 parts by weight of methoxymethyl nylon resin was dissolved in a mixed solvent consisting of 320 parts by weight of methanol and 80 parts by weight of water. While stirring, the "scent-emitting silica powder" was uniformly mixed and dispersed in the solvent. This liquid dispersion was introduced into 5000 or more parts by weight of water contained in a separate container followed by stirring, whereupon the resin precipitated out in the form of small granules of 1 to 2 mm. in size. The separated granules were filtered and dried. As a result, methoxymethyl nylon resin containing about 13.3% by weight of rose perfume was produced. This scented resin retained its scent for a period of more than one year.

Table I below summarizes many scented plastics prepared according to this invention. Examples 1–4 are summarized in Table I under Nos. 1, 2, 3 and 6.

Experiments have also been carried out to illustrate the results obtained when the fresh supply of silica powder which is added to the aggregates has an apparent specific gravity which is smaller than that of the fine powder used to make the aggregates. The results under No. 4 in Table I were obtained with Tokusil, which is a hydrated silica, mixed with floral perfume rose to produce aggregates with Santogel being added in a second step and finally with Aerosil which is anhydrous silica. In the case of No. 5 in the table, Santogel is used at first, followed by Aerosil. The measured values of volume per gram for No. 4 and No. 5 are 4.3 cc./g. and 4.4 cc./g., respectively. This means that they belong to standard goods as are No. 1–No. 3. In order to disperse the scent emitting powder of No. 4 and No. 5 into gas permeable plastics, either one of A, B or C process may be used.

Experiment No. 7, Table 1 illustrates the use of only "Aerosil" as finely divided silica powder. After mixing 150 parts of floral perfume rose with 70 parts of "Aerosil" to produce aggregates, 70 parts of "Aerosil" is mixed therewith to produce "scent emitting silica powder." The dispersion of such scent emitting silica powder into gas permeable plastics is carried out in the same manner as in No. 6.

Experiment No. 8 illustrates the embodiment in which "scent emitting silica powder" is prepared from only "Tokusil" which is then dispersed into polyethylene manufactured by the high pressure process. This preparation was conducted as follows: 150 parts by weight of a prepared floral rose perfume was added to 100 parts by weight of hydrated silica powder to form a gel, which was then cut into small segments. After adding 90 parts by weight of fresh hydrated silica powder and kneading, a fine powder was formed which was a "scent emitting silica powder." The power thus prepared was added to 6300 parts by weight of high pressure polyethylene pellets and the mixture was mixed well in a tumbler. The mixture was then heat-melted in an extruder, and was extruded. The extruded mixture was then cooled with water and was cut into minute pieces by a cutter. Scent-emitting polyethylene pellets containing about 2.26% by weight of rose perfume were obtained.

Experiments No. 9 and 10 illustrate the use of only hydrated silica powder as finely divided silica powder. In Experiment No. 9 "Santocel" is the hydrated silica powder while "Tokusil" and "Santocel" are used in Experiment No. 10. In the latter case, "Tokusil" and floral perfume rose are mixed to produce aggregates and then "Santocel" whose apparent specific gravity is smaller than that of "Tokusil" is added thereto to produce scent emitting silica powder.

TABLE 1

| Experiment number | 1 | 2 | 3 | 4 | |
|---|---|---|---|---|---|
| | Specification Example 1 | Example 2 | Example 3 | | |
| | "Tokusil"® and "Aerosil"® | "Tokusil"® and "Aerosil"® | "Tokusil"® and "Aerosil"® | "Tokusil"® "Santocel"® "Aerosil"® | "Santocel"® "Aerosil"® |
| Floral perfume, rose | 150 | Repellent 125 | 100 | 150 | 150 |
| Hydrated silica: | | | | | |
| "Tokusil"® | 100 | 125 | 66 | 100 | |
| | 50 | | 33 | | |
| "Santocel"® | | | | 40 | 90 |
| | | | | | 40 |
| Anhydrous silica "Aerosil"® | 17 | 14 | 11 | 17 | 20 |
| Scent emitting silica powder, total | 317 | 264 | 210 | 307 | 300 |
| Perfume (percent), total | 47.31 | 47.34 | 47.61 | 48.86 | 50.0 |
| Volume (cc./g.) | 4.4 | 4.4 | 4.4 | 4.3 | 4.4 |
| Added zinc stearate | Standard | 4.4 | 4.4 | 4.3 | 4.4 |
| | 33 | 27 | | | |
| Plastics | | | | Similar to No. 1 (Ex. 1) | |
| | High pressure polyethylene | | Vinyl chloride | or No. 2 (Ex. 2) | |
| | | | | or | |
| | Pellets 6,300 | Pellets 2,900 | 2,600 | No. 3 (Ex. 3). | |
| | | Low pressure polyethylene | (D.O.P) | | |
| | | Pellets 2,900 | 1,300 | | |
| | | High pressure polyethylene | | | |
| | | Powder 435 | | | |
| Mixing | Extruder | Extruder | Extruder calender | | |
| Moldings | Injection mold Petal 0.2–0.5 16 g. (mm). | Net extruder Net 0.5–1.0 (mm.) filament diameter | Sheet 0.2–0.22 (mm.) | | |
| Perfume in plastic (percent) | 2.27 | | 2.47 | | |

TABLE 1—Continued

| Experiment number | 6 | 7 | 8 | 9 | 10 |
|---|---|---|---|---|---|
| | Specification Example 4 "Tokusil"® "Aerosil"® | Only anhydrous "Aerosil"® | Only hydrated "Tokusil"® | Only "Santocel"® | Only "Tokusil"® "Santocel"® |
| Floral perfume, rose | 20 | 150 | 150 | 150 | 150 |
| Hydrated silica: | | | | | |
| "Tokusil"® | 20 | | 100 | | 100 |
| | | | 90 | | |
| "Santocel"® | | | | 90 | 80 |
| | | | | 80 | |
| Anhydrous silica "Aerosil"® | 10 | 70 | | | |
| | | 70 | | | |
| Scent emitting silica powder, total | 50 | 290 | 340 | 320 | 33 |
| Perfume (percent), total | 40.0 | 53.45 | 44.12 | 46.88 | 45.45 |
| | 5.6 | 5.17 | 3.62 | 4.06 | 4.15 |
| Volume (cc./g.) | | | Only hydrated silica is given below | 4.06 | 4.15 |
| | | | | 4.06 | |
| | | Similar to No. 6 (Ex. 4) | | | |
| Plastics | Methoxy met l nylon | Plastic solution | Polyethylene (high) | | |
| | 100 | | 6,300 | | |
| | 80% methanol | | | | |
| | 400 | | | | |
| | In water | | Extruder | | |
| | 5,000 or more | | | | |
| | Small granules 1–2 mm. diameter | | Pellet | | |
| Perfume in plastic (percent) | 13.3 | | 2.26 | | |

The data in Table 2 show that the upper limit in the proportion of the liquid scent-emitting substance is about 50–67% of the total weight of the silica powder and the liquid scent-emitting substance. If the same scent emitting liquid substance is used and the finely divided silica powder only is changed, then the quantity of the scent emitting liquid substance involved when aggregates begin to produce has been found, through our experimental measurement, to increase as the apparent specific gravity thereof decreases.

TABLE 2

| | | | G. Liquid substance in 100 g. of silica | | |
|---|---|---|---|---|---|
| Silica powder | Trade name | Apparent specific gravity | Floral purfume, jasmin (g) | Essential oil sandal wood oil (g.) | Percent liquid substance total percent |
| Number: | | | | | |
| 13 | Hydrated silica | "Tokusil"® | .218 | | 103.9 | 50.96 |
| 14 | do | do | .218 | 148.1 | | 59.68 |
| 15 | do | "Santocel"® | .096 | 162.0 | | 61.45 |
| 16 | Anhydrous silica | "Aerosil"® | .054 | 202.1 | | 66.89 |

The results summarized in Table 3 demonstrate that it is necessary to use hydrated silica powder in the first step, in the formation of the aggregates and then add the anhydrous silica powder in the second step. If the anhydrous powder is used in the first step, the results are not satisfactory.

I claim:

1. A scented plastic composition, comprising a gas-permeable plastic material having dispersed therein a scent-emitting silica powder having a structure comprising an internal part of hydrated silica which consists of aggregated particles of size smaller than mesh 300 (B.S. system) each having a liquid scent-emitting substance adsorbed thereon and an external part consisting of a layer of fine anhydrous silica particles.

2. A composition according to claim 1, wherein said liquid scent-emitting substance is at least one scent-emitting substance selected from the group consisting of floral perfumes and essential oils.

3. A composition according to claim 1, wherein said

TABLE 3

| | Trade name | Apparent specific gravity | No. 11, invention | No. 12, not invention |
|---|---|---|---|---|
| Floral perfume, rose | | | 150 | 150 |
| First added silica powder: | | | | |
| Hydrated silica | "Tokusil"® | .218 | 100 | |
| Anhydrous silica | "Aerosil"® | .054 | | 70 |
| Next added silica powder: | | | | |
| Hydrated silica | "Tokusil"® | .218 | | 100 |
| Anhydrous silica | "Aerosil"® | .054 | 70 | |
| Total weight | | | 320 | 320 |
| Perfume/total (percent) | | | 46.88 | 46.88 |
| Volume (cc./g.) | | | 4.47 | 2.75 |
| | | | Strong scent emitting | Very poor scent emitting | liquid scent-emitting substance is one which emits a scent that attracts or repels insects.

4. A process for manufacturing a scented plastic material, which comprises mixing a liquid scent-emitting substance with a hydrated silica powder produced by a wet process until the resulting mixture forms into aggregates, a fresh supply of anhydrous silica powder is added to the formed aggregates and is kneaded with the same until said aggregates are formed into a scent-emitting silica powder having a size not greater than mesh 300 (B.S. system) and dispersing the thus-obtained scent-emitting silica powder in a gas-permeable plastic material.

5. The process according to claim 4 wherein said liquid scent-emitting substance is at least one scent-emitting substance selected from the group consisting of floral perfumes and essential oils.

6. The process according to claim 4, wherein said liquid scent-emitting substance is one which emits a scent that attracts or repels insects.

7. The process according to claim 4, wherein said scent-emitting silica powder is dispersed into said gas-permeable plastic material while the gas-permeable plastic material is molten.

8. The process according to claim 4, wherein said scent-emitting silica powder is dispersed into a solution of said gas-permeable plastic, and said plastic material is precipitated and separated from said solution.

9. The process according to claim 4, wherein fresh supply of said powder has an apparent specific gravity smaller than that of said powder first mixed with said scent-emitting substance.

10. The process according to claim 9, wherein said hydrated silica powder is silica of the formula $SiO_2 \cdot nH_2O$ having an apparent specific gravity of about 0.218 and a particle size of 10–40 millimicrons and said anhydrous silica powder is a silica of the formula $SiO_2$ having an apparent specific gravity of about 0.054 and a particle size of 5–25 millimicrons.

11. The composition according to claim 1 wherein the plastic is a member selected from the group consisting of polyethylene, polypropylene, cellulose acetate, methoxymethyl nylon, polyvinyl chloride polyvinylidene chloride.

12. The composition according to claim 11, additionally comprising a plasticizer.

References Cited

UNITED STATES PATENTS

| | | | |
|---|---|---|---|
| 2,879,244 | 3/1959 | Cols | 260—32.6 |
| 3,234,028 | 2/1966 | Dunham, Jr. | 252—522 |

MORRIS LIEBMAN, Primary Examiner

S. L. FOX, Assistant Examiner

U.S. Cl. X.R.

106—308 O; 424—69